July 21 1925.  1,546,857
T. G. MUELLER ET AL
BELT PULLEY CLUTCH CONTROL FOR TRACTORS
Filed Dec. 13, 1923
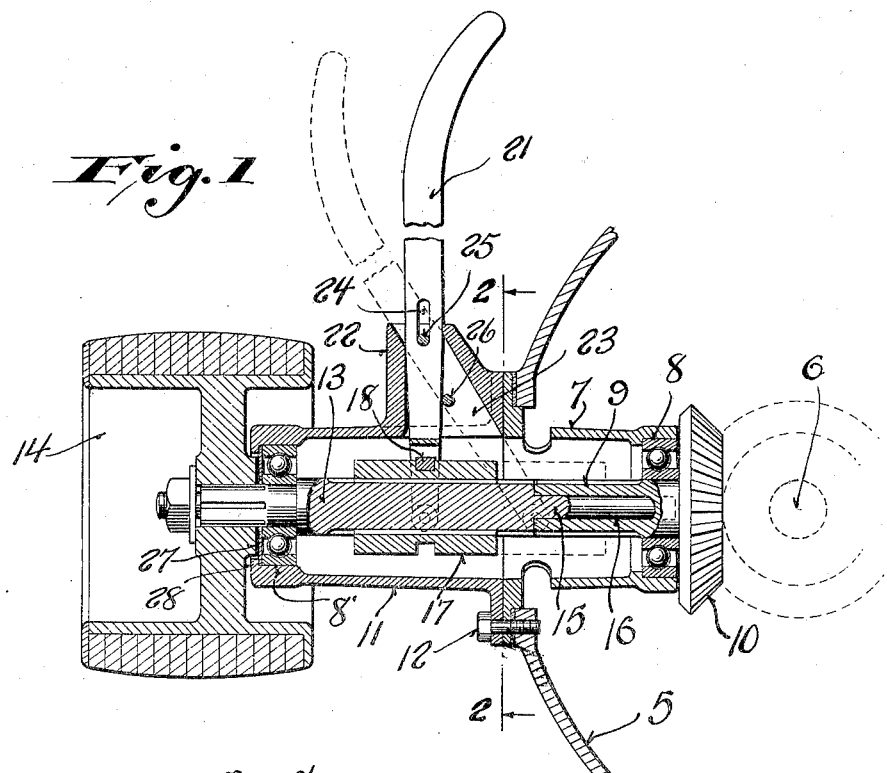
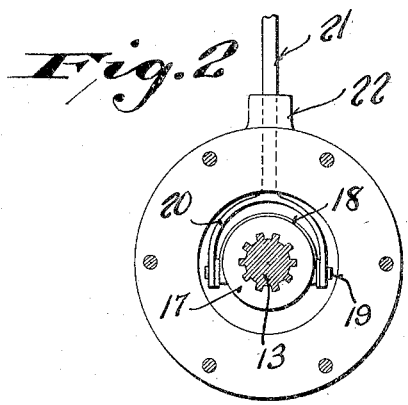
Inventors!
Theodore G. Mueller
Alfred R. Buchholz
Paul O. Dallmann
George C. Moerschel
Max J. Kujawski
William H. Schmidt
By
Attorneys Patented July 21, 1925.

1,546,857

UNITED STATES PATENT OFFICE.

THEODORE G. MUELLER, ALFRED R. BUCHHOLZ, PAUL O. DALLMANN, GEORGE C. MOERSCHEL, MAX J. KUJAWSKI, AND WILLIAM H. SCHMIDT, OF MILWAUKEE, WISCONSIN, ASSIGNORS TO DALLMANN MACHINE & MFG. CO., OF MILWAUKEE, WISCONSIN.

BELT-PULLEY-CLUTCH CONTROL FOR TRACTORS.

Application filed December 13, 1923. Serial No. 680,450.

*To all whom it may concern:*

Be it known that we, THEODORE G. MUELLER, ALFRED R. BUCHHOLZ, PAUL O. DALLMANN, GEORGE C. MOERSCHEL, MAX J. KUJAWSKI, and WILLIAM H. SCHMIDT, all citizens of the United States, and residents of Milwaukee, in the county of Milwaukee and State of Wisconsin, have invented certain new and useful Improvements in Belt-Pulley-Clutch Controls for Tractors; and we do hereby declare that the following is a full, clear, and exact description thereof.

This invention relates to a belt pulley clutch control and is more specifically adapted for the connection of the power shaft of a tractor to the pulley shaft by means of which the power from a tractor engine is used for operating stationary machinery.

This invention is an improvement over that disclosed in Patent No. 1,480,021 for belt pulley clutch control for tractors, issued Jan. 8, 1924, to Claude C. Smith and has in general the same objects as those disclosed in such application.

Further objects of this invention are to provide a unit which may be attached to the usual housing which surrounds the main power shaft of a tractor, which is adapted to permit instant operative connection to be established between the driving shaft or power shaft of the tractor and the auxiliary or side pulley, which is so constructed that maximum strength is afforded against distortional stresses when the pulley is operatively driven, and in which a sturdy and simple type of mechanism is provided.

Further objects are to provide a unit adapted for attachment as an entity to the main housing of the tractor and which is so constructed that clutch mechanism is provided whereby the driven and driving shafts may be operatively coupled or disconnected, in which a minimum of bearings is provided although the full strength of bearing support is afforded, and to provide mechanism whereby a minimum of friction is present either when the pulley is being actively driven or when the pulley is idle.

An embodiment of the invention is shown in the accompanying drawings, in which:—

Figure 1 is a longitudinal sectional view through the unit showing a fragment of the housing of the tractor and indicating the power shaft or main shaft of the tractor in dotted lines.

Figure 2 is a transverse sectional view on the line 2—2 of Figure 1.

Figure 3 is an enlarged fragmentary detail illustrating a portion of the splined joint.

The housing 5 or casing which encloses the main power shaft 6 of the tractor is provided with an aperture through which projects the inner portion 7 of the housing of the unit. This inner portion is provided with a roller bearing 8 at its innermost end which supports the relatively short driving shaft 9 of the unit. The inner end of the driving shaft 9 carries a bevel gear 10 which meshes with a bevel gear provided upon the power shaft 6 of the tractor. The outer portion 11 of the housing is assembled in alignment with the portion 7 thereof, and each of the portions is provided with a flange. These flanges are simultaneously secured by means of a set of bolts 12 which pass through such flanges and are threaded into the adjacent portion of the main casing 5,—a suitable gasket being provided to secure an oil tight joint. If desired, the inner portion 7 may be provided with apertures to place it in communication with the interior of the main casing or housing 5. A driven shaft 13 is positioned in alignment with the driving shaft 9 and projects outwardly beyond the outer end of the outer housing 11 and carries the auxiliary or side pulley 14. This driven shaft is provided with a reduced extension 15 which fits within an elongated aperture 16 formed in the driving shaft 9.

It is to be noted that this reduced extension 15 projects, as shown in dotted lines in Figure 1, into the portion of the driving shaft 9 which is directly supported by the roller bearings 8. This construction furnishes a two bearing support for the driven shaft 13 and also furnishes an extended support for the driving shaft 9 without, however, requiring two additional bearings adjacent the meeting ends of the shafts 9 and 13.

The shafts 9 and 13 are provided with splines or ribs, as shown in the drawings, particularly Figure 3. If desired, the ribs or splines upon the shaft 9 may be provided with tapered ends adjacent the outer end of such shaft, as shown in Figure 3.

A collar 17 similarly contoured interiorly co-operates with the splined portions of the shafts 9 and 13. The collar is provided with a groove within which fits a U-shaped shoe 18 which conforms thereto and extends around such groove to an extent slightly greater than a semi-circle, so that it will be retained in position by its inherent resiliency. This shoe is provided with laterally disposed trunnions 19 which are pivotally positioned within the apertured terminals of the forked arm 20 of the shift lever 21. This shift lever passes through a slotted opening 23 formed in an enlarged upwardly extending projection 22 carried by the outer portion 11 of the housing, and is provided with a suitably shaped, preferably curved outwardly extending handle portion adapted for manual manipulation. This lever is slotted, as indicated at 24, and cooperates with a pin 25 fastened to the projection 22, as shown in Figure 1. If desired, a removable pin 26 may be provided and may pass through appropriate apertures in the projection 22 to retain the sleeve 17 in its retracted or inoperative position, as shown in Figure 1. It is to be noted that the slot connection between the pin 25 and the lever 21 allows for the longitudinal motion of the lever when it is shifted. It is also to be noted that the projection 22 is provided with slanting inner surfaces to accommodate the full motion of the lever 21 without unduly increasing the size thereof and is so arranged that the lever 21 substantially fills the outermost portion of the coutout 23 in all of its positions, as shown in Figure 1.

It is to be noted that when the parts are in their inoperative position that the sleeve or collar 17 is fully retracted and is out of contact with any portion of the shaft 9, a suitably extended spline connection being provided upon the shaft 13 to permit this complete retraction of the collar. Thus, when the shaft 9 is running idle, there will be no frictional wear between the collar and the shaft 9 or between the collar and the shaft 13. However, when the collar couples the shafts 9 and 13 it forms a second reinforce or joint between the shafts;—the reduced extension forming one joint against lateral distortion and the collar forming an additional joint against such distortion.

It will be seen therefore, that a single bearing is provided by the housing for each of the shafts 9 and 13 and that a common central bearing or support for the juxtaposed ends of the shafts is secured by the reduced extension 15 and the bored out portion 16, and that this joint is additionally reinforced by the sleeve 17 when the clutch is in closed position. This, in effect, constitutes a double joint when power is being transmitted, that is to say, when the shafts are subject to maximum distorting or deflecting stresses and, as stated, this construction dispenses with two additional bearings adjacent the meeting ends of the shafts.

It is to be noted that the parts run in oil as the housing 7 is provided with apertures which allow the oil within the housing 5 to flow into the housing of the clutch control. The outer end of the housing 11 is closed by means of a disk 27 which is held tightly against the shoulder 28 of the housing 11. This disk is suitably apertured to permit the projecting portion of the shaft 13 to pass therethrough and bears against the inner portion of the ball bearing 8'. Thus an oil tight joint is made for the unit and the parts are allowed to run in oil at all times without danger of any leaking.

It will be seen, therefore, that belt pulley clutch control for tractors has been provided, in which a maximum strength is secured, in which a minimum number of bearings are employed, in which wear and frictional losses are minimized, and in which a sturdy and simple type of construction is provided.

Although the invention has been described in considerable detail, it is to be understood that the invention may be variously embodied and is, therefore to be limited only as claimed.

We claim:

A belt pulley clutch control unit adapted for attachment to a tractor, said unit comprising an inner housing member and an outer housing member having adjacent flanges adapted for attachment to a tractor, said housing members each having a bearing adjacent its outer end, a driving shaft projecting through the bearing of the inner housing member, a driven shaft aligned with said driving shaft and projecting through the bearing in the outer housing member and into close proximity to said first mentioned shaft, a pulley carried by the outer end of said driven shaft, a sleeve slidably mounted upon said shafts and having splined connections therewith, a projection carried by said outer housing member and having a slotted interior portion and provided with an outwardly opening portion, a lever pivotally mounted within said projection and adapted to operate within said slotted portion and to substantially fill the outwardly opening part of said slotted portion in all positions of such lever, and means operatively coupling said lever and said sleeve.

In testimony that we claim the foregoing we have hereunto set our hands at Milwaukee, in the county of Milwaukee and State of Wisconsin.

MAX J. KUJAWSKI.
A. R. BUCHHOLZ.
GEORGE C. MOERSCHEL.
THEODORE G. MUELLER.
P. O. DALLMANN.
W. H. SCHMIDT.